INVENTOR
Allen Friedman

Feb. 9, 1960 A. FRIEDMAN 2,924,157

APPARATUS FOR VARYING SET WIDTHS IN A PHOTOCOMPOSING SYSTEM

Filed April 30, 1958 3 Sheets-Sheet 2

INVENTOR

Feb. 9, 1960 A. FRIEDMAN 2,924,157

APPARATUS FOR VARYING SET WIDTHS IN A PHOTOCOMPOSING SYSTEM

Filed April 30, 1958 3 Sheets-Sheet 3

INVENTOR
Allen Friedman 2,924,157
Patented Feb. 9, 1960

2,924,157

APPARATUS FOR VARYING SET WIDTHS IN A PHOTOCOMPOSING SYSTEM

Allan Friedman, Highland Park, Ill.

Application April 30, 1958, Serial No. 732,002

6 Claims. (Cl. 95—4.5)

This invention relates to apparatus for varying set widths in a photocomposing system, and more particularly to apparatus for varying the amount of movement of a receiving surface on which characters having predetermined set widths are to be reproduced in a photocomposing system.

Many photocomposing systems have been devised for reproducing text material photographically and for justifying each line in such text material. Generally, in order to justify a line of text material, the spaces between words in each line are increased by predetermined amounts so that the lengths of all lines are identical. Each character of a given type in such systems has a predetermined set width which generally remains constant and accounts for a predetermined part of the total length of the line. In one scheme, for example, the set widths of all characters to be reproduced bear a certain relationship with the upper case "W." For example, when the upper case "W" is to have a height equal to its width, its "set width" is defined as eighteen units. All other characters will have a set width of some value less than eighteen. Then, if different type is to be reproduced, the relationship of all characters with respect to the upper case "W" may be completely different. In all photocomposing systems devised heretofore for reproducing justified text material, the structure for reproducing characters of different types has been extremely complicated and expensive. In many of such prior art systems, expensive and bulky counting mechanisms have been provided to perform this function or many physical changes to the apparatus are necessary to reproduce different types which appear in the text material.

An object of the present invention is to provide new and improved apparatus for varying set widths in a photocomposing system.

Another object of the invention is to provide apparatus for varying the amount of movement of a receiving surface of a photocomposing system on which characters having predetermined set widths are to be reproduced.

A still further object of the invention is to provide new and improved apparatus for varying the set widths of characters of different types in a photocomposing system.

With these and other objects in view, an apparatus for varying set widths of characters to be reproduced in a photocomposing system, illustrating certain features of the invention, may include a keyboard unit for providing an exclusive potential upon the selection of each character having a predetermined set width to be reproduced, a terminal board having a plurality of input and output terminals thereon, means for applying the potential associated with each selected character to a predetermined one of the input terminals, a receiver on which the selected characters are reproduced successively, means connected to the output terminals for controlling the operation of the receiver and means including a plurality of conductive paths for connecting together predetermined output terminals on the terminal board to predetermined input terminals to energize the receiver-controlling means in accordance with the set widths of the characters to be reproduced.

Other objects and many of the attendant advantages of this invention will be readily appreciated as the invention becomes better understood by reference to the following description, when taken in conjunction with the following drawings, wherein.

Figure 5:
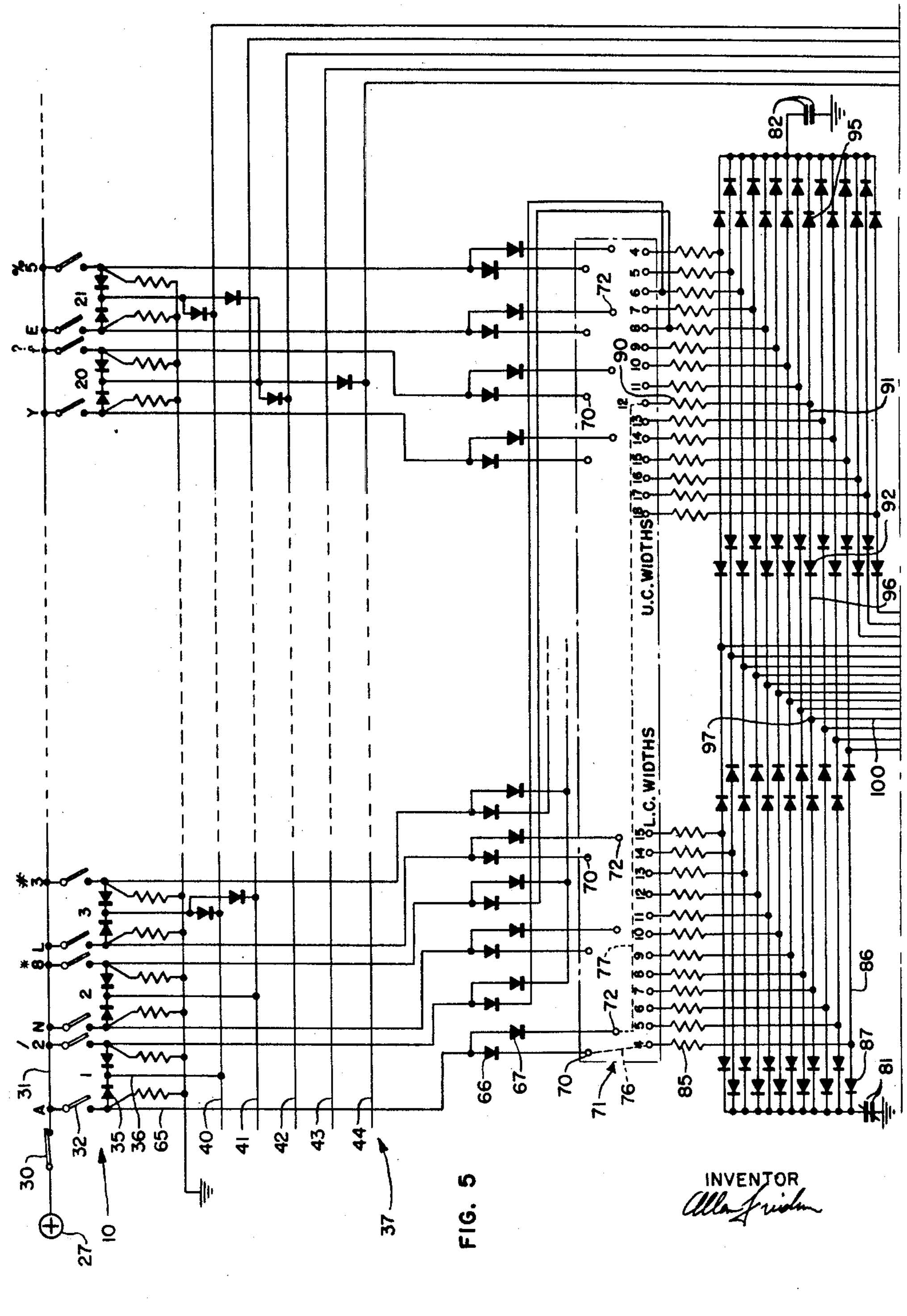
Figs. 5 and 6, when arranged in a manner depicted in Fig. 7, is a schematic circuit diagram of a photocomposing system embodying features of the present invention.
Figures 6, 7:
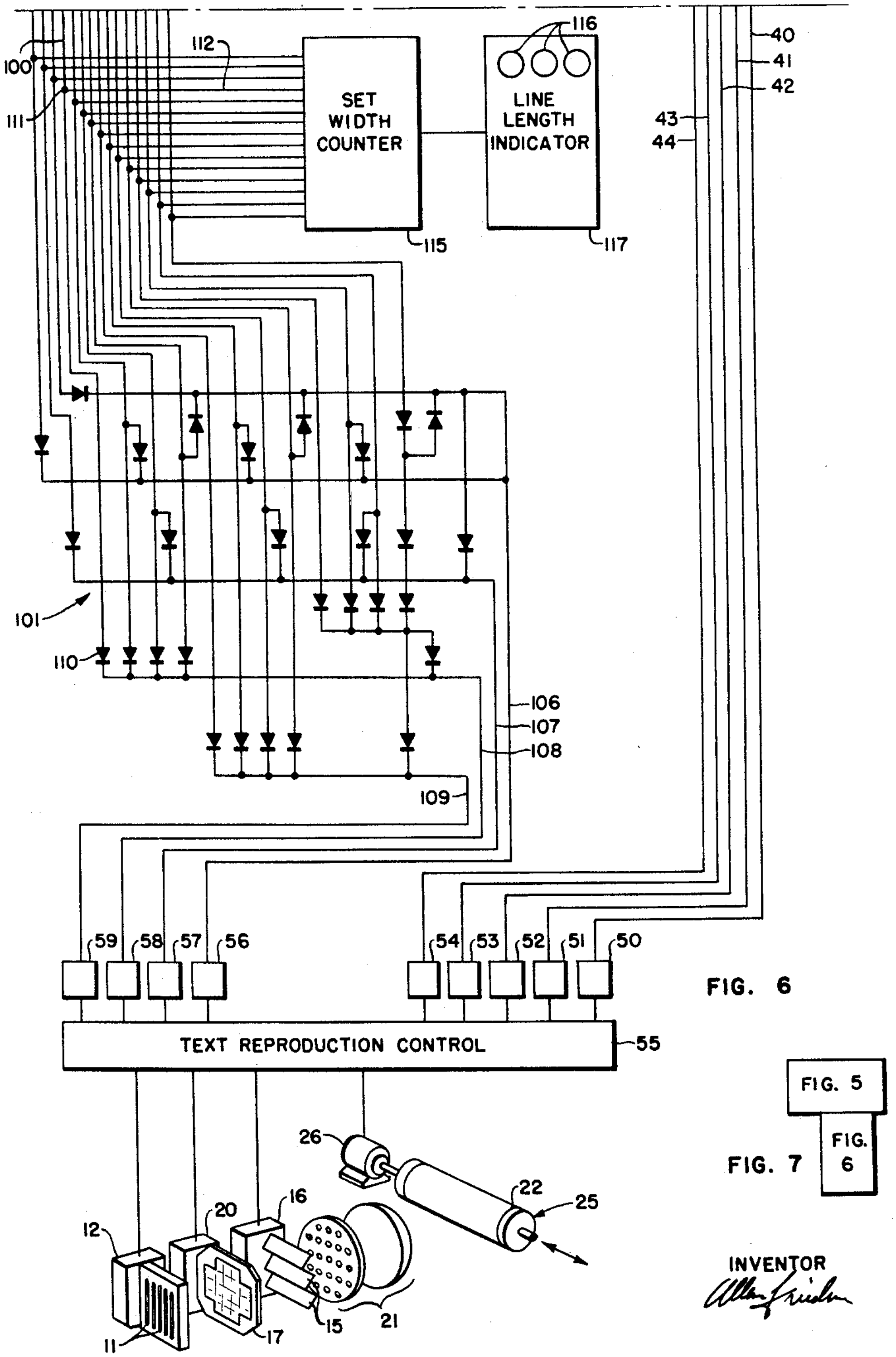

The photocomposing system shown partially diagrammatically and partially schematically in Figs. 5 and 6 is similar to the photocomposing system described and claimed in application Serial No. 705,659, which was filed on December 27, 1957, by J. Gardberg and entitled "Photocomposing System." The Gardberg application is incorporated herein by reference to the same extent as if it were reproduced herein in its entirety. Portions of the Gardberg application will, however, be described which are pertinent for the understanding of the present invention. In the Gardberg application, the detailed operation of the photocomposing system was described for the selection and reproduction of the upper case "A." In order to understand fully the present invention, a brief description of the selection and reproduction of this character will be given herein below.

Referring to Figs. 5 and 6, a keyboard and control unit is shown and designated by the numeral 10. The unit 10 may be a modified version of a standard typewriter keyboard having thereon keylevers for all characters to be reproduced and for all functions used in the reproduction of such characters. Upon the selection of a character, for example, a predetermined flash lamp (Fig. 6), of a group of such flash lamps 11—11 which are controlled by a flash lamp control mechanism 12, is energized, and a predetermined shutter, of a group of such shutters 15—15 which are controlled by a shutter control mechanism 16, is opened. Then, as described more fully in my application Serial No. 694,019, filed November 1, 1957, and entitled "Methods of and Apparatus for Photocomposing Text Material," a light path is passed through the selected character in a type font 17, controlled by a font control mechanism 20, and an image of the selected character is passed through the open shutter 15, a lens system 21 and onto a sheet 22 of light-sensitive material which is secured to a cylinder 25. The structure shown in the lower part of Fig. 6 is located within a light-excluding cabinet, and the selected character is reproduced therein on the light-sensitive sheet 22.

The cylinder 25 is rotated by a motor 26 for a predetermined distance in accordance with the set width of each character to be reproduced. This is done since the characters are placed on the font 17 on their sides, and rotation of the cylinder 25 will cause the characters to be reproduced in a line across the sheet 22. Further, since the characters have different set widths, the cylinder 25 must be rotated different distances corresponding to such set widths. Also, to provide line feed of the text material being reproduced on the light-sensitive sheet 22, the cylinder 25 is moved longitudinally of its axis by instrumentalities not shown. With respect to the rotation of the cylinder 25 by the motor 26, a feature of the present invention includes means for varying the amount of such rotation in accordance with the set widths of different character types in the type font 17. That is, as different types are placed in the font 17, the characters thereof will have different set widths with respect to the upper case "W." In accordance with the present invention, a single element is substituted in the system each time characters of different types are placed in the type font 17.

Assume, now, that the upper case "A" is to be reproduced by the system shown in Figs. 5 and 6. Upon the selection of the upper case "A" on the keyboard and control unit 10, a positive potential is applied from a source 27, through a "run-standby" switch 30 and to a lead 31. When the upper case "A" is selected, a switch 32 is closed by a keylever (not shown) on the keyboard and control unit 10, and the switch 32 remains closed for a time which is determined by mechanical instrumentalities (not shown). With the switch 32 closed, the positive potential on the lead 31 is applied through a diode 35 and is impressed on leads 36 and 40. As described in the Gardberg application, the lead 36 is one of thirty-one input leads to a 31-to-5 converter, a portion of which is shown in Fig. 5 and designated by the numeral 37, and the lead 40 is one of five output leads thereof. The remaining output leads include the leads 41 to 44, inclusive, and each of the five output leads 40 to 44, inclusive, is connected to one of five oscillators 50 to 54, inclusive and respectively. As described in the Gardberg application, the oscillators 50 to 54, inclusive, generate signals of different frequencies, and predetermined ones of the oscillators are energized upon the selection of characters and certain functions to place magnetic spots in exclusive patterns on a magnetic tape (not shown) in a recorder in the photocomposing system. These stored signals then energize character-selecting structure in a printer in the system, and this structure includes the flash lamps 11—11, the type font 17, and the shutters 15—15. An image of the selected character is then projected through the lens system 21 and onto the light-sensitive sheet 22.

All of the apparatus between the oscillators 50 to 54, inclusive, and the structure described above for reproducing selected characters is shown in a block in Fig. 6 and designated "text reproduction control" and by the numeral 55. Such a designation is adequate for the purposes of explaining the present invention. It can be seen, then, that the five oscillators 50 to 54, inclusive, energize structure within the control device 55 for choosing a particular character on the type font 17 and for projecting an image of such character onto the light-sensitive sheet 22. After the reproduction of each such character, the cylinder 25 must be rotated by the motor 26 for a predetermined distance equal to the set width of the chosen character. The amount that the motor 26 rotates the cylinder 25 is dependent upon which one of a group of four oscillators 56 to 59, inclusive, is energized. For example, when the upper case "A" is to be reproduced, only the oscillator 58 will be energized to place a magnetic spot on the tape, as described in the Gardberg application, and this single magnetic spot will operate the control device 55 to energize the motor 26 and to drive the cylinder 25 a distance which is equal to twelve units, the chosen set width of the upper case "A."

When the upper case "A" is selected, the switch 32 is closed, as described hereinabove. Consequently, the positive potential on the lead 31 is applied over a lead 65 and to the upper sides of two diodes 66 and 67. The lower side of the diode 66 is connected to an upper input terminal 70 which is one of a plurality of such upper terminals on a terminal board 71. The lower side of the diode 67 is connected to an intermediate input terminal 72 which is also one of a plurality of such intermediate terminals on the board 72. Also located on the board 71 are two groups of lower output terminals which are designated "lower case widths" and "upper case widths" in Fig. 5. A numeral appears adjacent to each of the lower output terminals, and these numerals indicate the range of set widths of which the photocomposing system is capable. Referring, for example, to the terminals designated as "upper case widths," the numerals adjacent to such terminals range between "4" and "18." If the upper case "W" is to be reproduced, a connection will be made from the switch associated with the keylever for this character, similar to the switch 32 for the upper case "A," to the terminal designated "18" of the "upper case widths" terminal in a manner to be described.

Figures 2, 3, 4:
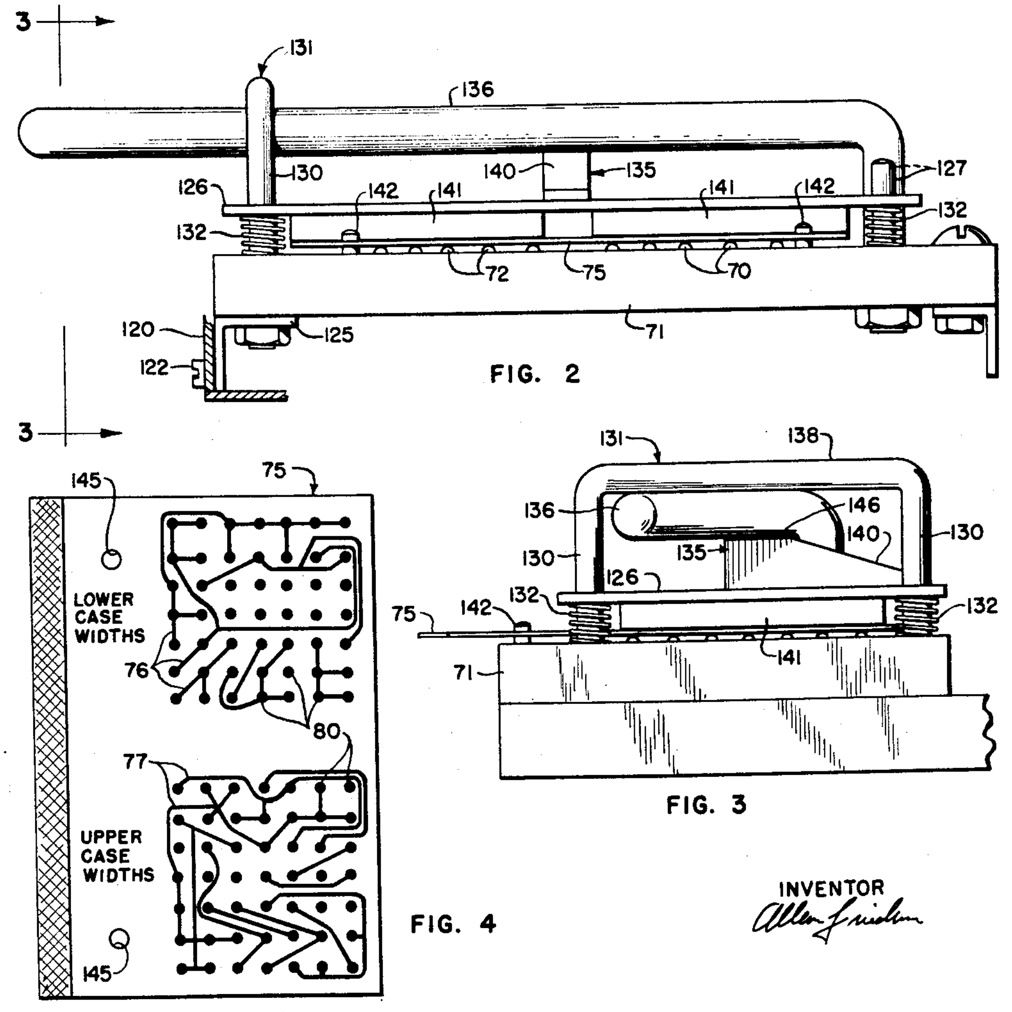
Fig. 2 is a vertical, front elevation of an apparatus embodying features of the present invention.
Fig. 3 is a vertical, side elevation as seen along the line 3—3 of Fig. 2.
Fig. 4 is a plan of a set width insert which forms a feature of the present invention.

Each of the upper input terminals 70—70 is connected selectively to one of the lower terminals in the "lower case widths" group. Likewise, each of the intermediate input terminals 72—72 is connected selectively to one of the lower output terminals in the "upper case widths" group. These selective and conductive paths are made by a set width insert which is shown in Fig. 4 and designated therein by the numeral 75. The set width insert 75 is formed from a thin sheet of nonconductive material, and conductive paths 76—76 and 77—77 are deposited thereon by suitable methods known in the printed-circuit art. Each of the conductive paths 76—76 and 77—77 is connected between predetermined ones of a plurality of circular areas 80—80 of conductive material. When the set width insert 75 is inserted in the recording unit of the photocomposing system, as will be described more fully hereinbelow, predetermined ones of the conductive paths 76—76 connect the upper input terminals 70—70 to the lower output terminals of the "lower case widths" group. Likewise, the conductive paths 77—77 connect each of the intermediate input terminals 72—72 to a predetermined one of the lower output terminals of the "upper case widths" group.

Continuing with the reproduction of the upper case "A," when this character is selected, a positive potential is applied to the left-hand, upper input terminal 70 and to the left-hand, intermediate input terminal 72. The upper input terminal 70 is connected, for a particular type to be reproduced, to the output terminal "4" of the "lower case widths" group by a conductive path 76. Consequently, if a lower case "a" were to be reproduced, its set width would have four units. However, the upper case "A" is to be reproduced, so that a conductive path 77 on the set width insert 75 connects the left-hand, intermediate terminal 72 to the lower output terminal designated by the numeral "12" in the "upper case widths" group. This means that, for the particular type to be reproduced, the upper case "A" has a set width of twelve units.

It can be seen, therefore, that when the upper case "A" is selected, positive potentials are applied to a terminal ("4") in the "lower case widths" group and to a terminal ("12") in the "upper case widths" group. Whether the printer in the system receives signals indicative of four units of set width or twelve units of set width is determined by which of two pairs of contacts 81—81 or 82—82 (Fig. 5) is closed. The closure of these contacts is described in the Gardberg application, and, as described therein, if an upper case character is to be reproduced, the contacts 81—81 will be closed, and the contacts 82—82 will be opened, as shown in Fig. 5. With the contacts 81—81 closed, the positive potential which is applied to the output terminal "4" of the "lower case widths" group is applied across a resistor 85 and to a lead 86. This potential then renders a diode 87 conductive and is impressed through the contacts 81—81 to ground. Therefore, it can be seen, that the potential applied to the "lower case widths" group of output terminals on the terminal board 71 is grounded and is thereby rendered ineffective.

However, since the contacts 82—82 are open, the potential which appears on the output terminal designated by the numeral "12" in the "upper case widths" group is impressed across a resistor 90 and is applied to a lead 91, to the right side of a diode 92 and to the left side of a diode 95. The diode 95, poled as shown in Fig. 5, would ordinarily be rendered conductive by this potential in the same manner as the diode 87 was rendered conductive, but since the contacts 82—82 are open, the circuit therefor is incomplete. This positive potential, however, renders the diode 92 conductive, is impressed therethrough and over a lead 96, to a junction point 97. From there, this potential is impressed on a lead 100 which is one input lead of a plurality of such input leads to a 15-to-4 converter 101. Each of the four output leads 106 to 109, inclusive, of the converter 101 is connected to one of the oscillators 56 to 59, inclusive and respectively.

When the positive potential is applied to the input lead 100 of the 15-to-4 converter 101, it is also applied to the upper side of a diode 110 in the 15-to-4 converter 101. This positive potential renders the diode 110 conductive and is impressed on the output lead 108 to render the oscillator 58 operative. As described in the Gardberg application and stated hereinabove, the operation of the oscillator 58 places a magnetic spot on a magnetic tape, and the signal caused thereby in the control device 55 in the system printer energizes the motor 26 to rotate the cylinder 25 a distance equal to twelve units of set width. As mentioned hereinabove, this is equal to the set width of the upper case "A." Consequently, after the proper flash lamp 11 and the proper shutter 15 have caused the upper case "A" to be projected onto the light-sensitive sheet 22, the motor 26 rotates the cylinder 25 a distance equal to twelve units of set width, the set width of the upper case "A." In this manner all characters and word spaces in a line of the text material to be reproduced are distributed across the sheet 22 in accordance with their set widths.

When a positive potential is applied to the lead 100, upon the selection of the upper case "A," this potential is applied also to a junction point 111 and to a lead 112. The lead 112 is one of a plurality of input leads to a set width counter 115. As described more fully in the Gardberg application, a positive potential on the lead 112 will drive the set width counter 115 to a count of twelve. This count will then cause counters 116—116 in a line length indicator 117 to be driven down by a similar count. Before each line of text material to be reproduced is selected by the keyboard and control unit 10, a count is registered on the counters 116—116 in the line length indicator 117 which is equal to the total number of units in the line. Then, as each character, such as the upper case "A," is chosen, this total count is reduced to an amount which is equal to the set width of the chosen character. The same reduction of the count in the line length indicator 117 is effected by the selection of the word space function. Consequently, an operator, by referring to the counters 116—116 in the line length indicator 117, knows exactly when the end of the line is approaching. He then takes the appropriate action to cause a carriage return function to be generated and all information necessary to justify a line to be placed on the magnetic tape. This structure is described in detail in the Gardberg application, and no further description need be made herein.

From the above description, it can be seen that with the present invention, in order to reproduce characters of different types and having different set widths on different fonts, such as the font 17, it is only necessary when replacing the font 17 to substitute a different set width insert 75 therefor. In the making of type fonts, the necessary set width for each character thereon in order to provide the proper spacing of the character in its line is determined beforehand, and the conductive paths 76—76 and 77—77 necessary to connect the proper input terminals 70—70 and 72—72 to the proper output terminals in the "lower case widths" and "upper case widths" groups are formed on the set width insert 75. Therefore, in the operation of the photocomposing system, extremely simple changes are necessary in order to reproduce different types, viz., it is only necessary to replace the font 17 and the set width insert 75 which corresponds thereto.

Figure 1:
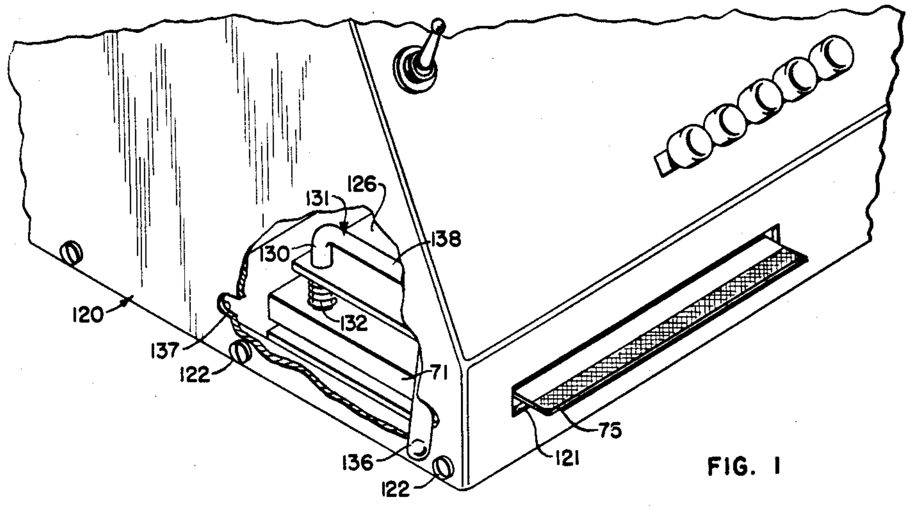
Fig. 1 is a partial prospective of a recorder cabinet structure for a photocomposing system including the present invention.

Referring now to Fig. 1, a partial perspective of a cabinet 120 which houses a recorder in the photocomposing system is shown. A slot 121 is formed in the lower, front end of the cabinet, and a set width insert 75, corresponding to the type font 17 to be used in the system, is inserted into the slot 121 and secured therein by the clamping mechanism shown in detail in Figs. 2 and 3. With this clamping structure, the conductive circular areas 80—80 on the set width insert 75 are secured against associated input and output terminals on the terminal board 71. In Figs. 2 and 3, the terminal board 71 is shown secured by screws 122—122 through a bracket 125 to the frame of the cabinet 120, and other suitable securing means may be provided. All of the terminals on the board 71, including the upper, intermediate and lower terminals shown in Fig. 5, are positioned on the terminal board 71 in a single plane. A metal plate 126 is positioned above the terminals on the board 71 and substantially parallel thereto, and the plate 126 is mounted for vertical movement by two dowels, one of which is shown in Fig. 2 and designated 127, and by vertical legs 130—130 of a U-shaped member 131. Positioned between the plate 126 and the terminal board 71 and surrounding each of the dowels 127—127 and the vertical legs 130—130 is a spring 132.

The springs 132—132 normally urge the plate 126 away from the terminal board 71, but the amount of upward movement caused thereby is restricted by a wedge-shaped member 135 and a cooperating lever 136 which protrudes from the side of the cabinet 120 through a slot 137 formed therein, and which is positioned between the wedge 135 and a horizontal leg 138 of the U-shaped member 131. The wedge 135 has a surface 140 thereon which is tapered in a direction toward the front of the cabinet 120, and the lever 136 is pivoted at its right-hand end, as viewed in Fig. 2, to the terminal board 71. Consequently, when the left-hand side of the lever 136 is manually moved forward, that is, toward the front of the cabinet 120, the plate 126 is free to move upwardly and the springs 132—132 urge the plate 126 to its uppermost position since the lever 136 is adjacent to the lower end of the tapered surface 140 on the wedge 135. When the plate is in its uppermost position, two sheets 141—141 of flexible material, such as sponge rubber and which are secured to the plate 126, are moved a predetermined distance above the terminals on the terminal board 71. When in this position, there is a space between the flexible sheets 141—141 and the terminals on the terminal board 71, so that the set width insert 75 may be inserted therebetween.

Two locating pins 142—142 are provided to cooperate with associated apertures 145—145, formed in the set width insert 75. When the set width insert 75 is inserted into the slot 121, with the conductive paths 76—76 and 77—77 down, and between the flexible sheets 141—141 and the terminals on the terminal board 71, and when the locating pins 142—142 are inserted into the apertures 145—145, the set width insert 75 is in its correct horizontal position. Then, upon moving the lever 136 toward the back of the cabinet 120, the lever 136 moves up the tapered portion 140 on the downwardly-moving wedge 135 and comes to rest on an upper, horizontal surface 146 thereof when the lever 136 is in its most rearward position. When in this position, the lever 136 is firmly, but movably, secured between the horizontal leg 138 of the U-shaped member 131 and the surface 146 of the wedge 135. Consequently, the lever 136 forces the wedge 135 and the plate 126 downwardly to press the flexible sheets 141—141 against the set width insert 75. As a result, the conductive circular areas 80—80 on the insert 75 are forced into firm electrical contact with the terminals on the terminal board 71.

Assume, now, that the type font 17 in the system printer is to be changed and that the new type font includes types wherein the set widths of the characters are different than the previously-used font 17. In the example described hereinabove, the upper case "A" had a set width of twelve units in the scheme being used. Assume that in the new font 17, the upper case "A" has a set width of only ten units. In this case, when the new font 17 is placed in position in the printer, a new set width insert 75 is inserted in position in the recorder cabinet 120 by simply pivoting the lever 136 toward the front of the cabinet, as shown in Fig. 1. When this is done, the lever 136 moves down the tapered surface 140 of the wedge 135, and the springs 132—132 move the plate 126 and the flexible sheets 141—141 upwardly and out of contact with the set width insert unit 75. Then, a new set width insert 75 and one having a conductive path 77 which connects the left-hand, intermediate input terminal 72 (Fig. 5) to the lower output terminal designated by the numeral "10" in the "upper case widths" group, is inserted into the slot 121 in the cabinet 120. The apertures 145—145 in the set width insert 75 are aligned with the locating pins 142—142, and the lever 136 is pivoted toward the rear of the cabinet 120. As described hereinabove, the flexible sheets 141—141 will be forced by the cooperation of the wedge 135 and the lever 136 against the upper side of the set width insert 75 and over substantially the whole area thereof so that the conductive circular areas 80—80 make firm electrical contact with the terminals on the terminal board 71. With this simple operation, an entirely new type font 17 can be used to reproduce the characters in the photocomposing system and the new set width insert 75 will cause the cylinder 25 to rotate the proper distances corresponding to the new set widths of the characters.

It is to be understood that the above-described embodiment of the invention is merely illustrative of the principles thereof and that numerous modifications and embodiments of the invention may be devised within the spirit and scope thereof.

What is claimed is:

1. Apparatus for varying the amount of movement of a receiving surface on which characters having predetermined set widths are to be reproduced in a photocomposing system, which comprises a keyboard and control unit for individually selecting characters to be reproduced and for generating a separate potential for each such character upon the selection thereof, means controlled by the potentials for reproducing the character associated therewith on the receiving surface, and means for advancing the receiving surface upon the selection of each character a distance corresponding to the set width of such character, the last-mentioned means comprising means for moving the receiving surface, a terminal board having a plurality of input and output terminals thereon, means for applying each of the potentials generated upon the selection of the characters to a predetermined input terminal on the terminal board, means controlling the receiving-surface-moving means by the potentials on the output terminals, an insertable insert unit having a plurality of conductive paths thereon for connecting electrically predetermined ones of the output terminals to the input terminals for applying the potentials generated upon the selection of the characters to be reproduced to the receiving-surface-moving means, and means for securing the conductive paths to their associated terminals.

2. Apparatus for varying the amount of movement of a receiving surface on which characters having predetermined set widths are to be reproduced in a photocomposing system, which comprises a keyboard unit for successively selecting the characters to be reproduced, a terminal board having a plurality of input and output terminals in the same plane, means controlled by the keyboard unit for providing separate potentials for each character upon the selection thereof and for applying each such potential to an associated one of the input terminals on the terminal board, control means for advancing the receiving surface subsequently to the reproduction thereon of each selected character, circuit means connecting the control means to the output terminals of the terminal board, a set width insert unit having a plurality of conductive paths formed thereon in the same plane as the terminals on the terminal board with such paths connectable between predetermined input and output terminals on the terminal board, and means for clamping the set width insert unit to the terminal board such that each potential associated with a selected character passes through a conductive path on the set width insert unit to a predetermined output terminal on the terminal board and energizes the control unit to advance the receiving surface a predetermined distance corresponding to the set width of the selected character.

3. Apparatus for varying the set width of characters to be reproduced in a photocomposing system, which comprises a keyboard and control unit for successively selecting characters to be reproduced and for generating an exclusive potential upon the selection of each such character, a receiving surface on which the selected characters are to be reproduced, means controlled by the generated potentials for reproducing the characters on the receiving surface, a terminal board having thereon a plurality of input terminals and a plurality of output terminals which correspond to the set widths of the selected characters, first circuit means for applying each generated potential to a predetermined input terminal upon the selection of the character associated therewith, control means for advancing the receiving surface subsequently to the selection of each character and prior to the selection of a succeeding character, second circuit means connecting the control means to the output terminals of the terminal board to energize the control means in accordance with the set width of each selected character upon the selection thereof, a set width insert unit having formed thereon a plurality of conductive paths which are arranged to connect each input terminal on the terminal board to a predetermined output terminal thereof, and quickly-detachable clamping means for securing the conductive paths of the set width insert unit to the terminals on the terminal board.

4. Apparatus for varying set widths of characters to be reproduced in a photocomposing system, which comprises a terminal board having formed thereon a plurality of input terminals and a plurality of output terminals the latter of which correspond to the set widths of the characters to be reproduced, means for generating an exclusive potential upon the selection of each character to be reproduced and for applying such potential to an input terminal of the terminal board, a receiving surface on which each character is to be reproduced, means for controlling the advancement of the receiving surface by the potentials appearing on the output terminals of the terminal board, a set width insert unit having formed thereon a plurality of conductive paths which are so constructed and arranged that each output terminal is connectable electrically thereby to a predetermined input terminal, a clamping plate mounted adjacent to the terminals on the terminal board, spring means operable to urge the clamping plate away from the terminal so that the set width insert unit can be positioned therebetween, and cam means operable to clamp the set width insert unit between the clamping plate and the terminals to connect each output terminal on the terminal board to a predetermined input terminal such that the controlling means advances the receiving surface in accordance with the set width of the selected character.

5. Apparatus for varying the set widths of characters to be reproduced in a photocomposing system, which comprises a keyboard unit for providing an exclusive potential upon the selection of each character having a predetermined set width to be reproduced, a receiving surface on which the selected characters are to be reproduced successively, means energized by the exclusive potential associated with each selected character for reproducing such character on the receiving surface, a terminal board having a plurality of input and output terminals formed thereon in the same plane, means for applying the potential associated with each selected character to a predetermined one of the input terminals, means controlled by the potentials on the output terminals for advancing the receiving surface in accordance with the set width of each selected character, and quickly-replaceable means for connecting electrically the potentials on each input terminal to a predetermined output terminal, the last-mentioned means comprising a set width insert card having formed thereon a plurality of conductive paths including a path connectable between each of the input terminals and the predetermined output terminals associated therewith, a clamping plate positioned in substantially the same plane as the plane of the terminals on the terminal board, a plurality of springs secured between and operable to urge the clamping plate and the terminal board from each other to permit the insertion of a set width insert card therebetween, a wedge having a tapered surface thereon secured to the clamping plate, and a lever operable to contact the tapered surface of the wedge to force the clamping plate toward the terminal board and thereby secure the conductive paths on the set width insert card between the associated input and output terminals thereon.

6. Apparatus for varying the amount of movement of a receiving surface on which characters having predetermined set widths are to be reproduced in a photocomposing system, which comprises a keyboard and control unit for generating an exclusive potential upon the selection of each character to be reproduced, means controlled by the potentials generated upon the character selections for reproducing the characters associated therewith successively on the receiving surface, means for advancing the receiving surface upon the selection of each character a distance corresponding to the set width of such character, a terminal board having a plurality of input terminals and output terminals positioned in the same plane, means for applying each potential generated upon the selection of a character to one of the input terminals, means energized by the potentials on the output terminals for controlling the receiving-surface-advancing means, a quickly-replaceable set width insert unit having a conductive path formed thereon for connecting each input terminal to a predetermined output terminal to convey the potential applied to such input terminal to the associated output terminal, the conductive paths on the set width insert unit being arranged in the same plane as the terminal on the terminal board, a clamping plate for securing the conductive paths of the set width insert unit to the terminals of the terminal board, means for mounting the clamping plate for movement to positions substantially parallel to the set width insert unit and the terminal board, a plurality of springs secured to the clamping plate mounting means and operable to urge the clamping plate to a position sufficiently distant from the terminal board to permit the positioning therebetween of a set width insert unit, a wedge member having a tapered surface thereon secured to the clamping plate, and a lever mounted pivotally to the terminal board and operable to cooperate with the clamping plate mounting means and the wedge member to force the clamping plate into engagement with the set width insert.

References Cited in the file of this patent

UNITED STATES PATENTS

| | | |
|---|---|---|
| 2,731,609 | Sobelt | Jan. 17, 1956 |
| 2,769,379 | Perry | Nov. 6, 1956 |
| 2,811,700 | Kuch | Oct. 29, 1957 |
| 2,834,268 | Williams | May 13, 1958 |
| 2,876,687 | Higonnet | Mar. 10, 1959 |

UNITED STATES PATENT OFFICE

CERTIFICATE OF CORRECTION

Patent No. 2,924,157

February 9, 1960

Allan Friedman

It is hereby certified that error appears in the printed specification of the above numbered patent requiring correction and that the said Letters Patent should read as corrected below.

Column 7, line 65, strike out the word "insert".

Signed and sealed this 13th day of September 1960.

(SEAL)
Attest:
:ARL H. AXLINE
ttesting Officer

ROBERT C. WATSON
Commissioner of Patents